(12) United States Patent
Pantel et al.

(10) Patent No.: US 8,762,365 B1
(45) Date of Patent: Jun. 24, 2014

(54) CLASSIFYING NETWORK SITES USING SEARCH QUERIES

(75) Inventors: Soo-Min Pantel, Bellevue, WA (US); Amber Roy Chowdhury, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/198,868

(22) Filed: Aug. 5, 2011

(51) Int. Cl.
*G06F 17/30* (2006.01)

(52) U.S. Cl.
USPC .......................................................... 707/710

(58) Field of Classification Search
USPC .............. 705/14.4–14.73; 707/768, 728, 775, 707/710
See application file for complete search history.

(56) References Cited

U.S. PATENT DOCUMENTS

| | | | |
|---|---|---|---|
| 7,890,441 B2 * | 2/2011 | Prakash et al. ................... 706/20 |
| 2003/0208578 A1 * | 11/2003 | Taraborelli et al. ............ 709/223 |
| 2004/0111504 A1 * | 6/2004 | Halim et al. ................... 709/223 |
| 2007/0100804 A1 * | 5/2007 | Cava ................................. 707/3 |
| 2007/0203940 A1 * | 8/2007 | Wang et al. ................ 707/103 R |
| 2008/0103892 A1 * | 5/2008 | Chatwin et al. .................. 705/14 |
| 2008/0270376 A1 * | 10/2008 | Svore et al. ......................... 707/5 |
| 2009/0006365 A1 * | 1/2009 | Liu et al. ............................ 707/5 |
| 2009/0265363 A1 * | 10/2009 | Lai et al. ........................ 707/100 |
| 2010/0161605 A1 * | 6/2010 | Gabrilovich et al. .......... 707/736 |
| 2010/0191746 A1 * | 7/2010 | Wang et al. .................... 707/750 |
| 2010/0262615 A1 * | 10/2010 | Oztekin et al. ................. 707/768 |

OTHER PUBLICATIONS

Click graph document classification—Learning Document Labels from Enriched Click Graphs, Lan Nie, Zhigang Hua, Xiaofeng He, Scott Gaffney, 2010 IEEE International Conference on Data Mining Workshop.*
Agglomerative Clustering of a search engine query log, Doug Beeferman, Adam Berger, ACM 2000 1-58113-233-6/66/08.*

* cited by examiner

*Primary Examiner* — Robert Beausoliel, Jr.
*Assistant Examiner* — Hau H Hoang
(74) *Attorney, Agent, or Firm* — Thomas Horstemeyer, LLP

(57) ABSTRACT

Disclosed are various embodiments for classifying network sites into site categories. A network site is classified into at least one of a plurality of categories based at least in part on similarity. Query popularity, query competitiveness, and/or query importance may be used in determining similarity. The similarity is measured between a first plurality of search queries and a second plurality of search queries. The first plurality of search queries is one that produced first search results that include the network site. The second plurality of search queries is one that produced second search results that include other network sites. Each of the other network sites has a respective category. The query-similarity based scoring may be combined with more scoring based on crawling and processing network page or network site contents.

22 Claims, 3 Drawing Sheets

CLASSIFYING NETWORK SITES USING SEARCH QUERIES

BACKGROUND

Online users are often interested in finding network sites that fit particular categories, for example, Retail, News, Blogs, Finance, Commercial, etc. Conventional computerized methods of classifying network sites into particular categories often involve visiting individual network pages within the network site, and parsing content on these network pages.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to computer-implemented classification of network sites into site categories and, more specifically, to classification using previously executed search engine queries. Particular attributes of search queries are used to determine similarity among sets of search queries. When a set of search queries that produces results in an unclassified network site is determined to be similar to another set of search queries that produces results in a particular classified network site, the unclassified network site is assigned into the category of the similar classified network site.

For example, suppose that network site "abc.com" is already classified into the category "News," and that network site "xyz.com" is not yet classified. Using the techniques described herein, when one set of 100 search queries that produced results containing "xyz.com" is determined to be similar to another set of 500 search queries that produced results containing "abc.com," then "xyz.com" may be classified as a "News" network site.

The search query attributes used to determine similarity may include direct attributes of a search query, or may include attributes that are derived from other attributes. Examples of attributes used to determine similarity include query importance, query popularity, and query competitiveness. These particular query attributes will be described in further detail below. However, other suitable attributes may be used to measure similarity. In some embodiments, a single query attribute is used to determine similarity between sets of queries. In other embodiments, determining similarity takes into account multiple attributes, and may involve weighting some attributes more than others. In the following discussion, a general description of the system and its components is provided, followed by a discussion of the operation of the same.

Figure 1:
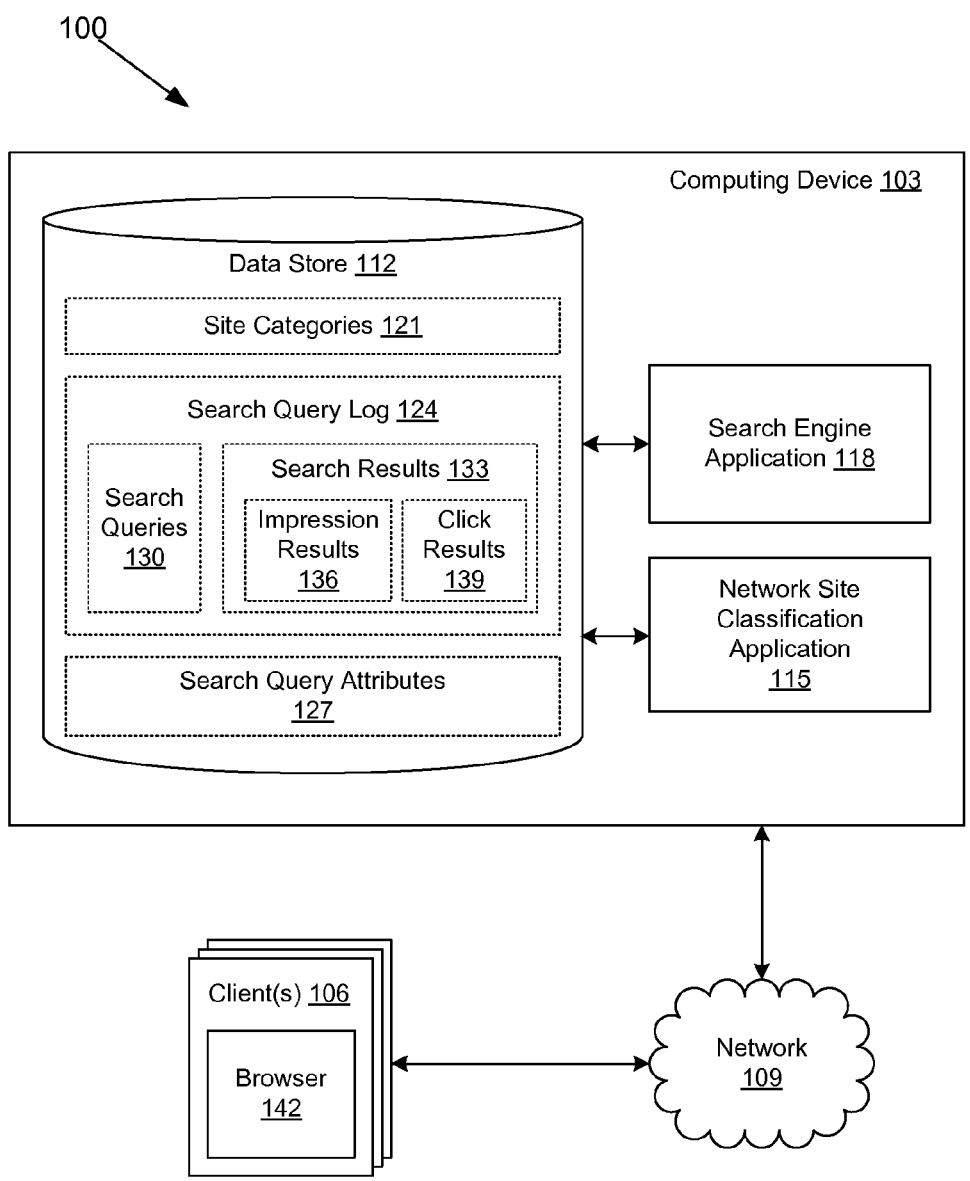
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include a network site classification application 115 and a search engine application 118. The components executed on the computing device 103 may also include other applications, services, processes, systems, engines, or functionality not discussed in detail herein. The data stored in the data store 112 includes data accessed by the network site classification application 115, such as, for example, site categories 121, a search query log 124, and search query attributes 127 as well as potentially other data. Entries in the search query log 124 describe search queries 130 and corresponding search results 133. The search query log 124 may also include information which indicates whether the user merely viewed search results listing various network pages, or also clicked on a particular search result 133 to access the network page provided in the search result 133. In some embodiments, the search results 133 may separately store impression results 136 and click results 139. Storing impression results 136 as well as click results 139 allows the network site classification application 115 to take into account metrics related to user interest. The search query log 124 may also include information about sponsored links or advertisements included with the search results, such as the identity of the advertiser, the price bid by the advertiser, and the price paid by the advertiser. Although in this disclosure the sponsored link or advertisement information is described as part of the search query log 124, in some embodiments the sponsored link or advertisement information is stored in a separate advertisement log (not shown). In some embodiments, the search queries and advertisements are logged separately but can be joined into a single view.

The search engine application 118 is executed to search a network 109 to find network pages which match a search query 130. Execution of a search query 130 produces a set of network pages matching the query, referred to as search results 133. Information about the query and its results are logged by the search engine application 118 in the search query log 124 within the data store 112. The search engine application 118 may be a general-purpose search engine that operates to search the Internet as a whole, or may be a site-specific search engine that is limited to searching one or more network sites.

The network site classification application 115 is executed to place a network site into an appropriate site category 121. In some embodiments, a network site includes any group of related network pages, such as web pages that are arranged in a hierarchy. A network site may thus refer to a web site for a top level domain (e.g. yahoo.com), and may also refer to a web site that is not a top level domain (e.g., finance.yahoo.com). The site category 121 is selected from a set of site categories 121 that are associated with network sites that have already been classified. For example, if three network sites www.abc.com, www.def.com, and www.xyz.com have been already been classified into News, Dictionary, and Retail (respectively), then the network site classification application 115 operates to classify a network site (e.g., www.foo.com) into News, Dictionary, and/or Retail. The techniques described herein apply to any type of site categories 121. Non-limiting examples of category types include topical categories and product categories. Also, site categories 121 may have a hierarchical structure or a flat structure.

The network site classification application 115 uses past search queries, stored in the search query log 124, to choose the appropriate site category 121 or site categories 121. Specifically, the network site classification application 115 determines similarity between search queries 130 that list the unclassified network site in the search results 133 and search queries 130 that list classified network sites in the search results 133. When a search query 130 producing a classified network site is determined to be similar to a search query 130 producing the unclassified network site, the network site classification application 115 sets the site category 121 of the unclassified network site to the site category 121 of the similar classified network site.

In various embodiments, the network site classification application 115 and the search engine application 118 may utilize any type of middleware framework to communicate with a client application executing on a client device 106 or with other applications executing on the computing device 103. Examples of such frameworks include remote procedure calls, simple object access protocol (SOAP), representational state transfer (REST), Windows Communication Foundation, and other frameworks.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability.

The client device 106 may be configured to execute various applications such as a browser 142 and other applications. The browser 142 may be executed in a client device 106, for example, to access and render network pages, such as web pages, or other network content served up by a web server, a page server, or other servers. The client device 106 may be configured to execute applications beyond browser 142 such as, for example, email applications, instant message applications, and/or other applications.

Next, a general description of the operation of the network site classification application 115 is provided, along with a description of various data used by the network site classification application 115. To begin, users interact with the search engine application 118 to execute search queries 130. The search queries 130 may include, for example, keywords or terms, term connectors, and/or criteria to limit the search by date, language, data type, network domain, etc. Each of the search queries 130 produces a set of corresponding search results 133, where a set of search results 133 includes at least a set of network pages. Each network page resides in a particular domain or network site, specified in the Uniform Resource Locator (URL) of the network page. For example, the network page with the URL www.foo.com/list.htm resides on the network site www.foo.com, as does the network page with the URL www.foo.com/myspace/dir.htm.

Information about the search queries 130 and the corresponding search results 133 are stored in the search query log 124. The entries in the search query log 124 may be organized into search query attributes 127. A list of non-limiting examples of search query attributes 127 includes date/time of the query, number of network pages in the search results, number of different network sites in the search results, terms in the query, frequency of the query, rate at which the user visits a network page in the search results (known as "click through"), number of advertisements placed on the search results network page; etc.

Site categories 121 are assigned to some of the network sites produced by the search queries 130. This assignment may be manual, automatic, or a combination of both. After some but not all of the network sites have been classified, the network site classification application 115 uses search queries 130 to classify at least some of the remaining network sites into one or more of the site categories 121. Specifically, the network site classification application 115 uses a similarity measure of search queries 130 for the classification, so that an unclassified network site that is determined to have similar queries as compared to a classified network site is assigned the category of the similar classified network site.

For example, when the search queries 130 in the search query log 124 which produce results residing in the network site www.xyz.com are determined to be similar to search queries 130 which produce results in the network site www.abc.com, then the network site classification application 115 may assign the site category 121 for www.abc.com (e.g., News) to www.xyz.com. In this manner, the network site classification application 115 uses similarity of search queries 130 to determine the appropriate site category 121 for an unclassified network site.

Various techniques or algorithms can be used to compute similarity across sets of search queries 130. Non-limiting examples of such techniques include the vector space model, support vector machines, and random forest classifiers. In embodiments which use machine learning algorithms, the attributes of the search queries 130 can be used as features of the machine learning algorithm.

The techniques used by the network site classification application 115 do not require accessing the individual network sites (sometimes referred to as "web crawling"), but instead use search queries which produce the network sites as search results. However, comparison of search query attributes as described herein can be used in addition to information obtained from traversing individual network sites, such as terms appearing on the network pages of a network site. In addition, the query-similarity based scoring described herein may be combined with scoring based on crawling and processing network page or network site contents.

Figure 2:
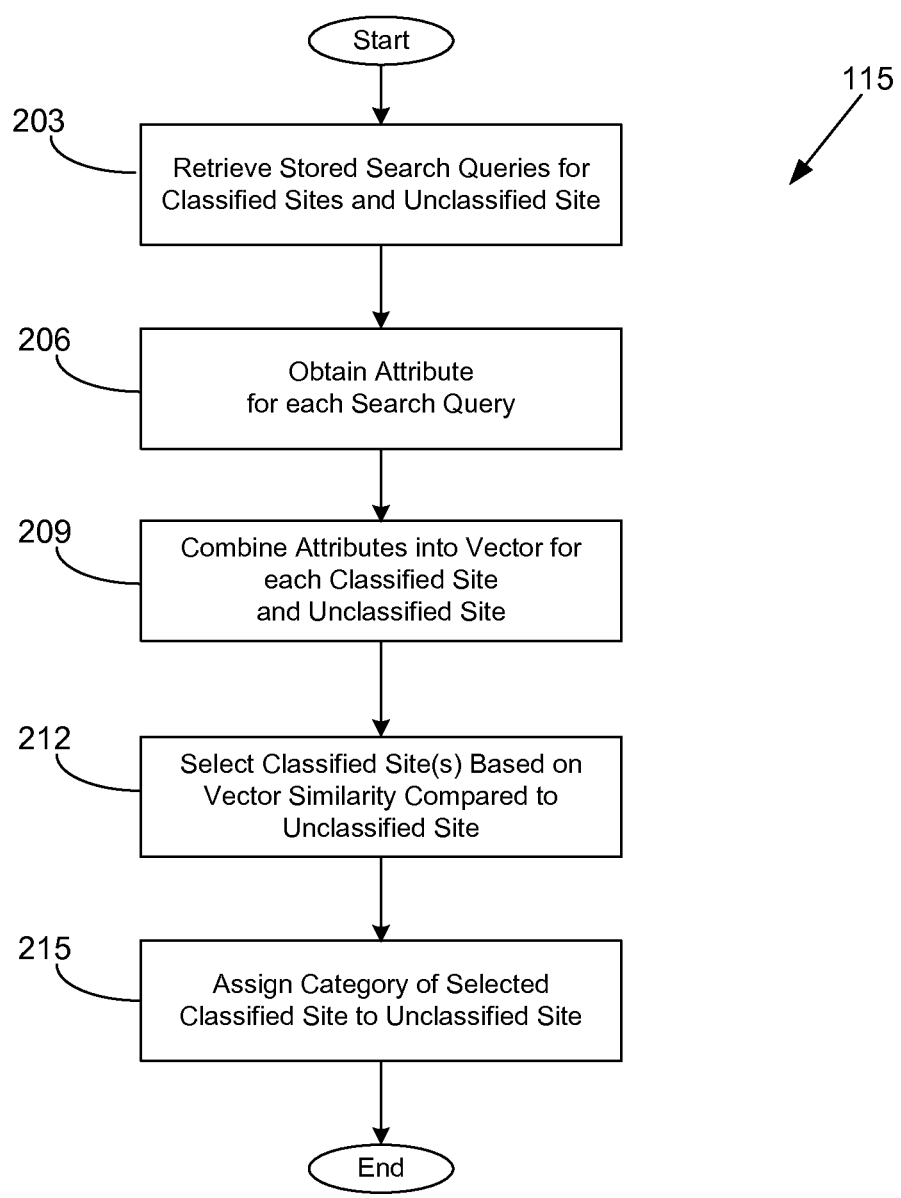
FIG. 2 is a flowchart illustrating an example of the operation of a network site classification application executed in a computing device in the networked environment of FIG. 1 according to various embodiments of the present disclosure.

Turning now to FIG. 2, shown is a flowchart that provides one example of the operation of a portion of the network site classification application 115 according to various embodiments. It is understood that the flowchart of FIG. 2 provides merely an example of the many different types of functional arrangements that may be employed to implement the operation of the portion of the network site classification application 115 as described herein. As an alternative, the flowchart of FIG. 2 may be viewed as depicting an example of steps of a method implemented in the computing device 103 (FIG. 1) according to one or more embodiments.

Beginning at box 203, the network site classification application 115 obtains, from the search query log 124 (FIG. 1), one set of search queries 130 (FIG. 1) which include a particular unclassified network site in the corresponding search results 133 (FIG. 1). At box 203, the network site classification application 115 also obtains, from the search query log 124, multiple groups of search queries 130, where each group includes a classified network site in the corresponding search results 133.

Thus, the search queries 130 are grouped by a network site: one group of search queries 130 produced results containing the unclassified network site (e.g., www.abc.com); another group of search queries 130 produced results containing a first one of the classified network sites (e.g., www.def.com); yet another group of search queries 130 produced results containing a second one of the classified network sites (e.g., www.xyz.com); etc. As described above, each of the classified network sites has already been classified into a site category 121 (FIG. 1). The network site classification application 115 then proceeds to use the search queries 130 to place the unclassified network site into the site category 121 of one of the classified network sites, as follows.

At box 206, the network site classification application 115 examines the search queries 130 retrieved at box 203 to obtain a search query attribute 127 (FIG. 1) for each of the search queries 130. The search query attribute 127 may measure, for example, importance of the search query 130, popularity of the search query 130, competitiveness of the query, or any other suitable attribute. Query importance involves query volume and indicates how effective the search query 130 is in generating traffic to a particular site. This behavior is sometimes referred to as "click through," as the user clicks through a particular search result on a search results page to arrive at a different network site. A search query 130 with high importance is one that generates high traffic to the site compared to other search queries 130. For example, the query "president" may be considered important to the network site "whitehouse.gov" if the query results in a lot of visits to "whitehouse.gov." Query popularity involves query frequency and indicates how many times a particular search query 130 is generated by a user or users, so that a search query 130 with high popularity is one that is submitted by many users (or by the same user many times) relative to other search queries 130. For example, the search query "George Washington president" may be considered more popular than the query "Millard Fillmore president." Where query importance is specific to a particular network site, query popularity is agnostic to, or independent of, a particular network site. The measure of popularity may be an absolute number of queries or an absolute frequency for the query, but can also be a popularity ranking relative to other queries. The query popularity may be computed, for example, as query frequency divided by the entire query volume. Query competitiveness indicates how valuable the search query 130 is to advertisers. Query competitiveness may be measured, for example, by the number of advertisements associated with the search results 133 produced by a search query 130, the number of advertisers associated with the search results 133 produced by a search query 130, the average price paid by advertisers for advertisements associated with the search results 133, or another measure of advertiser value. Query competitiveness thus involves a market for search terms where neither query popularity nor query importance necessarily involves such a market.

In some embodiments, the search query attribute 127 may be a numeric value produced by mapping the search query 130 to a numeric value. The search query attribute 127 may be obtained directly from the search query 130, or may be obtained indirectly through derivation from other attributes in the search query 130. Next, at box 209 the network site classification application 115 combines all the attributes from a group of search queries 130 into a vector (e.g., a first vector combining attributes of the search queries 130 for an unclassified site www.abc.com; a second vector combining attributes of the search queries 130 for a classified site www.def.com., etc.).

At box 212, the network site classification application 115 compares the similarity of the unclassified site vector to similarities of the classified site vectors. In some embodiments, the comparison involves first computing a similarity score for pairs of vectors. In such embodiments, each query in the vector may include one numeric entry, and each query is mapped to a numeric value using some function of a search query attribute 127. In some embodiments, each part of the search query attribute 127 is mapped to a numeric value and the product of those parts is computed. For example, query popularity could be computed as the log transformed query volume multiplied by a weight. Techniques used for computing document similarities (e.g., term frequency—inverse document frequency) may be applied here, as should be appreciated, by first mapping the search queries 130 to a document corpus. For example, the queries against each already classified or to-be-classified domain could comprise a "document" representing the domain and the term frequency—inverse document frequency scores could then be computed using this corpus.

In some embodiments, the computation of a similarity score involves vector space calculations. In some embodiments, the similarity computation involves computing the similarity of an unknown site vector to centroid of each category cluster. The centroid vector of a particular category may be generated, for example, by averaging the vectors of sites that fall into that category.

Having compared the vectors, at box 212 the network site classification application 115 also selects one or more of the classified network sites based on the similarity comparison. In some embodiments, the network site classification application 115 selects the classified site with the highest similarity. In other embodiments, the network site classification application 115 selects a classified site having a similarity that exceeds a predefined threshold. In some embodiments, multiple classified sites are chosen, for example, the classified sites with the highest N similarity scores, or all classified sites with a similarity score exceeding a predefined threshold. In some embodiments, the similarity score can be retained as an indicator of the confidence with which a network site can be asserted to be a member of a site category 121. In some embodiments, the network site classification application 115 aggregates search queries 130 at the network site level. For example, xyz.com/index1.html may be aggregated with xyz.com/index2.html.

Next, at box 215, the network site classification application 115 classifies the unclassified site by assigning the site category 121 of the classified site(s) selected in box 212 to the unclassified site. If multiple classified sites are chosen in box 212, then the network site classification application 115 may assign the unclassified network site to multiple site categories 121. The process of FIG. 2 is then complete.

Figure 3:
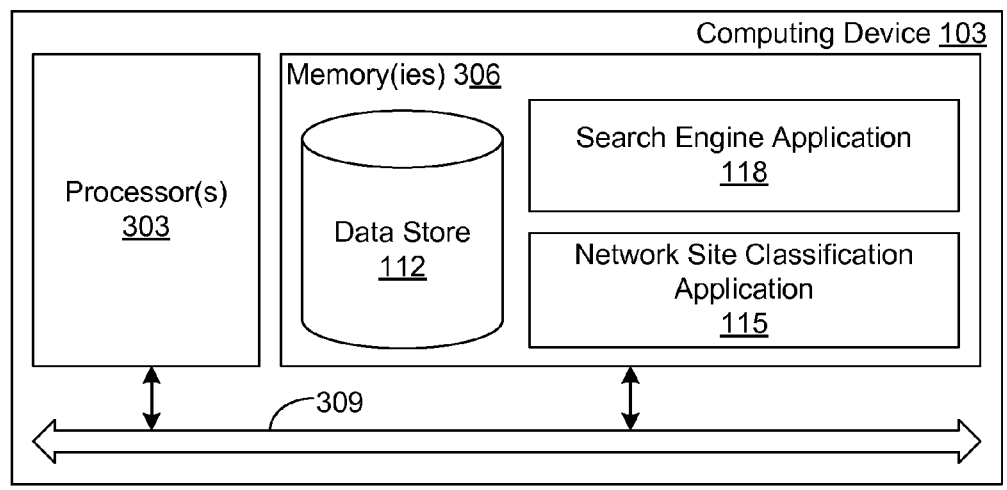
FIG. 3 is a schematic block diagram that provides one example illustration of a computing device employed in the networked environment of FIG. 1 according to various embodiments of the present disclosure.

Moving on to FIG. 3, shown is a schematic block diagram of the computing device 103 according to an embodiment of the present disclosure. The computing device 103 includes at least one processor circuit, for example, having a processor 303 and a memory 306, both of which are coupled to a local interface 309. To this end, the computing device 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are the network site classification application 115, the search engine application 118, and potentially other applications. Also stored in the memory 306 may be a data store 112 and other data. In addition, an operating system may be stored in the memory 306 and executable by the processor 303. While not illustrated, the client device 106 (FIG. 1) also includes components like those shown in FIG. 3, whereby the browser 142 is stored in a memory and executable by a processor.

It is understood that there may be other applications that are stored in the memory 306 and are executable by the processors 303 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors and the memory 306 may represent multiple memories that operate in parallel processing circuits, respectively. In such a case, the local interface 309 may be an appropriate network 109 (FIG. 1) that facilitates communication between any two of the multiple processors 303, between any processor 303 and any of the memories 306, or between any two of the memories 306, etc. The local interface 309 may comprise additional systems designed to coordinate this communication, including, for example, performing load balancing. The processor 303 may be of electrical or of some other available construction.

Although the network site classification application 115 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the network site classification application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network site classification application 115, that comprises software or code can be embodied in any non-transitory computer-readable medium for use by or in connection with an instruction execution system such as, for example, a processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
    code that retrieves a first plurality of search queries returning an unclassified network site;
    code that retrieves a second plurality of search queries, individual ones of the second plurality of search queries returning a respective one of a plurality of classified network sites, individual ones of the classified network sites having at least one category;
    code that obtains a first attribute for the individual ones of the first plurality of search queries, wherein the first attribute represents a query competitiveness comprising a measure of a value of a respective search query to an advertiser;
    code that obtains a second attribute for the individual ones of the second plurality of search queries, wherein the second attribute represents the query competitiveness;
    code that combines the first attribute from the individual ones query in the first plurality of search queries into a first vector;
    code that combines the second attribute from the individual ones of the second plurality of search queries into a respective plurality of second vectors;
    code that selects at least one of the classified network sites based at least in part on a similarity between the first vector and individual ones of the respective plurality of second vectors; and
    code that assigns the at least one category of the at least one selected classified network site to the unclassified network site.

2. The non-transitory computer-readable medium of claim 1, wherein either or both of the first and second attributes additionally represent a query popularity comprising a relative frequency between a first query and a second query.

3. A method, comprising:
    classifying, via a computing device, a network site into at least one of a plurality of categories based at least in part on a similarity between a first plurality of search queries and a second plurality of search queries, the first plurality of search queries having produced first search results that include the network site and the second plurality of search queries having produced second search results that include other network sites, individual ones of the other network sites having a respective category, wherein the similarity is based at least on a query competitiveness measured by a number of advertisers associated with a search query in one of the pluralities of search queries.

4. The method of claim 3, wherein the similarity is based at least on a query importance.

5. The method of claim 4, wherein the query importance indicates that the network site receives high search traffic, relative to the other network sites, for the search query.

6. The method of claim 3, wherein the similarity is based at least on a query popularity.

7. The method of claim 6, wherein the query popularity indicates a high frequency of use of the search query in a search engine relative to search queries in the first or the second plurality of search queries.

8. The method of claim 6, wherein the query popularity measures an absolute number of submissions of the search query in a search engine relative to search queries in the first or the second plurality of search queries.

9. The method of claim 3, wherein the query competitiveness is further measured by a number of advertisements displayed in conjunction with results of the search query.

10. The method of claim 3, wherein the query competitiveness is further measured by an average selling price of advertisements against the search query.

11. The method of claim 3, further comprising determining, via the computing device, the similarity by computing a similarity score.

12. The method of claim 3, further comprising determining, via the computing device, the similarity by computing a similarity score from a first feature vector representing the first plurality of search queries and a second feature vector representing the second plurality of search queries.

13. The method of claim 3, wherein the search queries in the first and second pluralities are associated with an attribute and the similarity is determined, via the computing device, based at least in part on the attribute.

14. The method of claim 13, further comprising determining, via the computing device, the similarity by computing a similarity score from the attributes of the first plurality of search queries and the attributes of the second plurality of search queries.

15. A system, comprising:
    at least one computing device; and a network site classification engine in the at least one computing device, the network site classification engine comprising:

logic that computes a plurality of similarities between a first plurality of search queries and individual ones of a second plurality of search queries, the first plurality of search queries returning an unclassified network site and the second plurality of search queries returning a plurality of classified network sites, individual ones of the classified network sites having a respective category, wherein the plurality of similarities are based at least on a query importance comprising a click through and the query importance is associated with a search query in the first plurality of search queries and the second plurality of search queries; and logic that classifies the unclassified network site into the respective category of one of the classified network sites based at least in part on the plurality of similarities.

16. The system of claim 15, wherein the plurality of similarities are based at least on a query competitiveness measured by a number of advertisements associated with search results for one of the pluralities of search queries.

17. The system of claim 15, wherein the plurality of similarities are based at least on a query popularity computed as a function of a query frequency divided by a query volume.

18. The system of claim 15, wherein the plurality of similarities are based at least on a query competitiveness measured by a number of advertisers associated with search results for one of the pluralities of search queries.

19. The system of claim 15, wherein the computing of similarities uses vector space calculations.

20. The system of claim 15, wherein the computing of similarities includes mapping each of the queries in the first and second search queries to a number to produce a first vector for the first plurality of search queries and a second vector for the individual ones of the second plurality of search queries.

21. The system of claim 15, wherein the logic that classifies the unclassified network site classifies the unclassified network site into the category of the classified network site having a highest one of the plurality of similarities.

22. The system of claim 15, wherein the logic that classifies the unclassified network site classifies the unclassified network site into the category of one of the classified network sites in which a corresponding similarity exceeds a predetermined threshold.

* * * * *